Mar. 13, 1923.
G. F. SPROULL
POTATO PLANTER
Filed Nov. 18, 1920
1,448,468
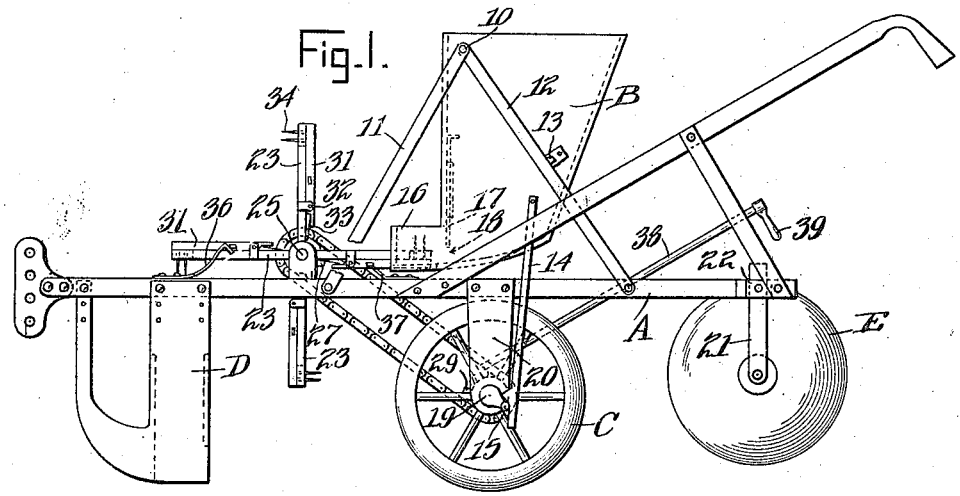
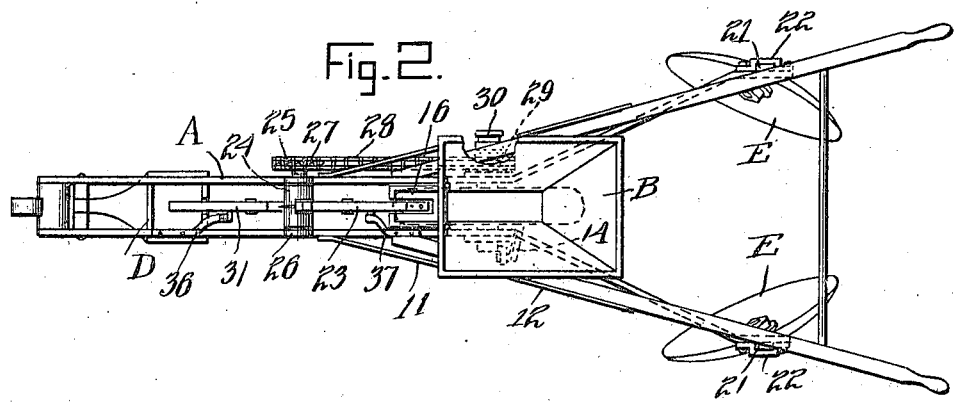
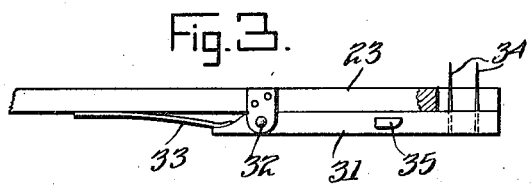
Inventor
George F. Sproull
By
Attorney Patented Mar. 13, 1923.

1,448,468

UNITED STATES PATENT OFFICE.

GEORGE F. SPROULL, OF MONTGOMERY, ALABAMA.

POTATO PLANTER.

Application filed November 18, 1920. Serial No. 424,952.

*To all whom it may concern:*

Be it known that I, GEORGE F. SPROULL, a citizen of the United States, residing at Montgomery, in the county of Montgomery and State of Alabama, have invented certain new and useful Improvements in Potato Planters, of which the following is a specification.

My said invention consists in an improved construction for potato planters whereby one potato or one piece of a potato prepared for seed may be mechanically selected from a hopper filled with such pieces and dropped in regular order and at regular intervals, all as will be hereinafter more fully described and claimed.

Referring to the accompanying drawings which are made a part hereof and on which similar reference characters indicate similar parts, Figure 1 is a side elevation of a potato planter constructed in accordance with my invention;

Figure 2, a top plan view of the same; and Figure 3 a detail view showing certain parts on an enlarged scale.

In said drawings, the portions marked A represent the frame of the planter, B the hopper, C a traction wheel, D a chute for receiving and guiding the potatoes to the furrow, and E covering disks.

The frame A is of any appropriate construction and requires no special description.

The hopper B is mounted on pivots 10 in a frame composed of bars 11 and 12 secured to the sides of the frame A and projecting upwardly to near the top of said hopper. The pivots 10 are positioned so that the center of gravity is near the front of the hopper. Means, as a stop 13, is provided to limit the forward movement of said hopper to normal position and a bar 14 with a cam near its lower end, is rigidly secured to the side of the hopper and extends down in position to contact with a cam or crank arm 15 on the axle of the wheel C, whereby the hopper is vibrated at each revolution of said wheel and then falls forward on its pivot 10 to contact with said stop, thus serving to jar and feed the potatoes forward into a forwardly extending portion 16 of said hopper. A sliding gate 17 is provided to control the width of the passageway 18 leading from the main hopper into said portion 16. The traction wheel C is mounted upon the axle 19 supported in brackets 20 depending from the sides of the framework A.

The spout D is secured near the front end of the framework, its lower end being formed as a shoe or furrow-maker as shown.

The covering disks E are mounted on suitable shanks 21 supported in sockets 22 near the rear of the frame and are positioned to cover the furrow and the seed potatoes planted therein by the mechanism preceding said covering disks.

The potato dropper comprises a reel having arms 23 mounted on a hub 24 which in turn is mounted on a shaft 25 supported in bearings 26 on the frame A. A sprocket wheel 27 is mounted on one end of said shaft 25 and is connected by a sprocket chain 28 with another sprocket wheel 29 on the axle 19 of wheel C. Said sprocket wheel 29 is preferably mounted loosely on said axle and is adapted to be connected to be driven by a clutch-part 30 mounted by a spline to turn with said axle and to slide back and forth into engagement with a similar clutch-part on the hub of said sprocket wheel.

Each arm 23 of the reel carries a member 31 mounted on the back thereof by means of a pivot or hinge 32 and normally held in contact therewith by a spring 33. The outer ends of said hinge members 31 are armed with brads or prongs 34 which project through apertures or slots in the arms 23 and are adapted to pick up the pieces of potato, as will be presently described.

In operation, the parts being in the position indicated in the drawings and the hopper filled with pieces of seed potatoes cut in the well known manner, the vibration of the hopper through the means of the arm 14 and crank 15, operates to feed the pieces of potato forward into the projecting portion 16 on the lower end of the hopper. The reel being connected to rotate, the arms thereof pass through a vertical slot in the extension 16 of the hopper and operate to pick up the pieces of potato one by one on the prongs 34 and carry the same around until the arm has made a half revolution, when the member 31 by means of a projection 35 on its side, strikes a cam face on a member 36 secured to the frame in position to contact with said projection at the proper position. This contact tends to lift member 31 to strip the potato from the prongs, allowing it to drop through the spout or chute

D to the furrow beneath. Each member 31 as it approaches the extension 16 of the hopper also contacts with the under face of a cam arm 37 which throws the prongs downward below the face of the arm 23 until the arm is within said extension and then it passes over said cam projection and the spring 33 tends to throw up said member and project the prongs 34 into the piece of potato which has been received on the top of the arm, carrying it through the slot in projection 16 and around to the opposite side where it is deposited in the chute D as before described. A shifting rod 38 operated by a handle 39 is mounted in convenient position for throwing the clutch-part 30 in and out so as to disengage the gear for operating the reel 23 whenever desired.

The term potato is used in the claims for convenience to indicate a whole potato or such a portion thereof as is commonly used for planting. As shown by the appended claims my invention is not limited to the exact mechanism shown and described, but may be modified in various ways within the scope of my invention.

Having thus fully described my said invention, what I claim as new and desire to secure by Letters Patent is:

1. In a potato planter the combination with a vibrating hopper of a rotary reel, the arms of which are adapted to pass through a portion of said hopper, each of said arms being provided with a pivoted member carrying prongs adapted to pick up pieces of potato as they pass through said portion of the hopper and carry same to a chute for depositing them in the ground, and means adjacent to said chute for tilting said pivoted arms to strip the potatoes therefrom substantially as set forth.

2. A potato planter comprising a hopper for containing the seed potatoes, means for vibrating said hopper to feed the potatoes forward, a rotary reel the arms of which are adapted to pass through a portion of said hopper, pivoted members carried by said arms and carrying prongs adapted to pick up pieces of potato, a chute arranged to receive said pieces of potato from said reel, and means for stripping said pieces of potato from the prongs as they approach said chute, substantially as set forth.

3. In a potato planter, a pivoted hopper having a vertically slotted extension thereon, means for vibrating the hopper bodily to carry potatoes into the extension, dropping means comprising brads adapted to enter said extension from the bottom in an upward direction, and means to impart a sudden upward movement to said brads to insure penetration of the potatoes, substantially as set forth.

4. A potato planter comprising a planting chute, a hopper pivoted at its upper end and having a reduced slotted extension projecting forward toward the chute and adapted to receive potatoes substantially in single file, means to impart a forwardly jarring motion to the lower end of the hopper, and a rotary dropper having grippers to enter said slot and carry successive potatoes therefrom to said chute, substantially as set forth.

5. A potato planter comprising a slotted planting chute, a pivoted hopper having a reduced slotted extension projecting toward the chute, a rotary dropper having rigid arms adapted to pass through the slots in said chute and said extension, brads on said arms, means to impart a quick upward thrust to said brads to impale potatoes thereon as the arms pass up through said slot in the extension and means for quickly retracting the brads as the arms enter said chute, substantially as set forth.

6. A potato planter having a frame, a supporting wheel, an axle, a clutch adapted to connect the wheel to the axle, a planting chute in advance of the supporting wheel, a hopper pivotally supported on the frame having a forward extension and a depending arm, a cam on the axle of the supporting wheel to move said arm rearwardly at intervals, a positive stop to limit the forward motion of the hopper and thus jar the potatoes into the extension, said extension being vertically slotted, and a rotary dropper driven from the axle of said supporting wheel and having grippers to enter said extension and carry the potatoes into said chute, substantially as set forth.

In witness whereof, I have hereunto set my hand and seal at Washington, District of Columbia, this 21st day of October, A. D. nineteen hundred and twenty.

GEORGE F. SPROULL. [L. S.]